US008227146B2

United States Patent
Min et al.

(10) Patent No.: US 8,227,146 B2
(45) Date of Patent: Jul. 24, 2012

(54) CATHODE CATALYST FOR FUEL CELL COMPRISING PLATINUM AND SELENIUM, MEMBRANE-ELECTRODE ASSEMBLY FOR A FUEL CELL HAVING THE SAME, AND FUEL CELL SYSTEM HAVING THE SAME

(75) Inventors: Myoung-Ki Min, Suwon-si (KR); Chan Kwak, Suwon-si (KR); Alexey Alexandrovichserov, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 175 days.

(21) Appl. No.: 11/984,886

(22) Filed: Nov. 23, 2007

(65) Prior Publication Data

US 2008/0138693 A1    Jun. 12, 2008

(30) Foreign Application Priority Data

Nov. 23, 2006    (KR) .................. 10-2006-0116415

(51) Int. Cl.
*H01M 4/02*    (2006.01)

(52) U.S. Cl. .......... 429/524; 429/523; 429/526; 429/528

(58) Field of Classification Search ............... 429/12–46, 429/400–535
See application file for complete search history.

(56) References Cited

U.S. PATENT DOCUMENTS

2002/0107140 A1 * 8/2002 Hampden-Smith et al. .. 502/185
2006/0093892 A1    5/2006 Min et al.

FOREIGN PATENT DOCUMENTS

| EP | 1524711 | 4/2005 |
| KR | 10-0495127 | 6/2005 |
| KR | 10-0550998 | 2/2006 |

OTHER PUBLICATIONS

Bron, M., et al., Influence of selenium on the catalytic properties of ruthenium-based cluster catalysts for oxygen reduction, Mar. 2001, Journal of Electroanalytical Chemistry, vol. 500, pp. 510-517.*
Villullas, H.M., et al., Electrochemical Oxidation of Methanol on Pt Nanoparticles Dispersed on RuO2, Jul. 2004, Jounal of Physical Chemistry B, vol. 108, pp. 12898-12903.*
Dassenoy et al., Structural Studies and Stability of Cluster-like RuxSey Electrocatalysts, Nov. 2002, J. Phys. Chem. B, vol. 106, pp. 12152-12157.*
Merriam-Webster's Collegiate Dictionary, 11th Ed., p. 410, (2003).*
Colomer et al., Structural, Microstructural, and Electrical Transport Properties of TiO2-RuO2 Ceramic Materials Obtained by Polymeric Sol-Gel Route, Mar. 2000, Chem. Mat., vol. 12, pp. 923-930.*

* cited by examiner

Primary Examiner — Basia Ridley
Assistant Examiner — Jonathan G Leong
(74) Attorney, Agent, or Firm — Robert E. Bushnell, Esq.

(57) ABSTRACT

The present invention relates to a cathode catalyst for a fuel cell, a membrane-electrode assembly for a fuel cell including the cathode catalyst, and a fuel cell system. The cathode catalyst includes a core including $RuO_2$, and Se and Pt. The Se and Pt are disposed to enclose the core. The cathode catalyst for a fuel cell of the present invention can have excellent catalyst efficiency, even if less platinum is included therein.

17 Claims, 5 Drawing Sheets

CATHODE CATALYST FOR FUEL CELL COMPRISING PLATINUM AND SELENIUM, MEMBRANE-ELECTRODE ASSEMBLY FOR A FUEL CELL HAVING THE SAME, AND FUEL CELL SYSTEM HAVING THE SAME

CLAIM OF PRIORITY

This application makes reference to, incorporates the same herein, and claims all benefits accruing under 35 U.S.C. §119 from an application earlier filed in the Korean Intellectual Property Office on Nov. 23, 2006 and there duly assigned Serial No. 10-2006-0116415.

BACKGROUND OF THE INVENTION

1. Field of the Invention

The present invention relates to a cathode catalyst for a fuel cell, a membrane-electrode assembly for a fuel cell, and fuel cell system including the same. More particularly, the present invention relates to a cathode catalyst having excellent activity, a membrane-electrode assembly for a fuel cell, and a fuel cell system including the same.

2. Description of the Related Art

A fuel cell is a power generation system for producing electrical energy through an electrochemical redox reaction of an oxidant and a fuel such as hydrogen, or a hydrocarbon-based material such as methanol, ethanol, natural gas, and the like.

Such a fuel cell is a clean energy source that can replace fossil fuels. It includes a stack composed of unit cells and produces various ranges of power output. Since it has four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of a high energy density and high power but also has problems that carefully handling of hydrogen gas is required, and the polymer electrolyte fuel cell requires accessory facilities such as a fuel reforming processor for reforming methane or methanol, natural gas, and the like in order to produce hydrogen as the fuel gas.

On the contrary, a direct oxidation fuel cell has a lower energy density and power than that of the gas-type fuel cell and needs a large amount of catalysts. However, it has the advantages of easy handling of the liquid-type fuel, a low operation temperature, and no need for additional fuel reforming processors.

In the above-mentioned fuel cell system, a stack that generates electricity substantially includes several to scores of unit cells stacked adjacent to one another, and each unit cell is formed of a membrane-electrode assembly (MEA) and a separator (also referred to as a bipolar plate). The membrane-electrode assembly is composed of an anode (also referred to as a "fuel electrode" or an "oxidation electrode") and a cathode (also referred to as an "air electrode" or a "reduction electrode") that are separated by a polymer electrolyte membrane.

A fuel is supplied to an anode and adsorbed on catalysts of the anode, and the fuel is oxidized to produce protons and electrons. The electrons are transferred into a cathode via an external circuit, and the protons are transferred into the cathode through the polymer electrolyte membrane. In addition, an oxidant is supplied to the cathode, and then the oxidant, the protons, and the electrons are reacted on catalysts of the cathode to produce electricity along with water.

SUMMARY OF THE INVENTION

One embodiment of the present invention provides a fuel cell cathode catalyst having excellent catalyst activity. The cathode catalyst includes a core comprising at least one selected from the group consisting of $RuO_2$, Ir, $Ir_2O_3$, $MnO_2$, WC, and combinations thereof, and Se and Pt that are disposed to enclose the core.

Another embodiment of the present invention provides a membrane-electrode assembly for a fuel cell including the catalyst. The membrane-electrode assembly includes an anode, a cathode facing the anode, and a polymer electrolyte membrane interposed between the anode and the cathode. The cathode includes a catalyst comprising Se, Pt, and a core. The Se and the Pt are disposed to surround the core.

Yet another embodiment of the present invention provides a fuel cell system including the membrane-electrode assembly. The fuel cell includes an electrical generator, a fuel supplier for supplying a fuel to the electrical generator, and an oxidant supplier for supplying an oxidant to the electrical generator. The electrical generator includes at least one membrane-electrode assembly and a separator disposed next to the membrane-electrode assembly. The membrane assembly includes an anode, a cathode facing the anode, and a polymer electrolyte membrane interposed between the anode and the cathode. The cathode includes a catalyst comprising Pt, Se, and a core comprising at least one selected from the group consisting of $RuO_2$, Ir, $Ir_2O_3$, $MnO_2$, WC, and combinations thereof, wherein the Se and the Pt are disposed to surround the core.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
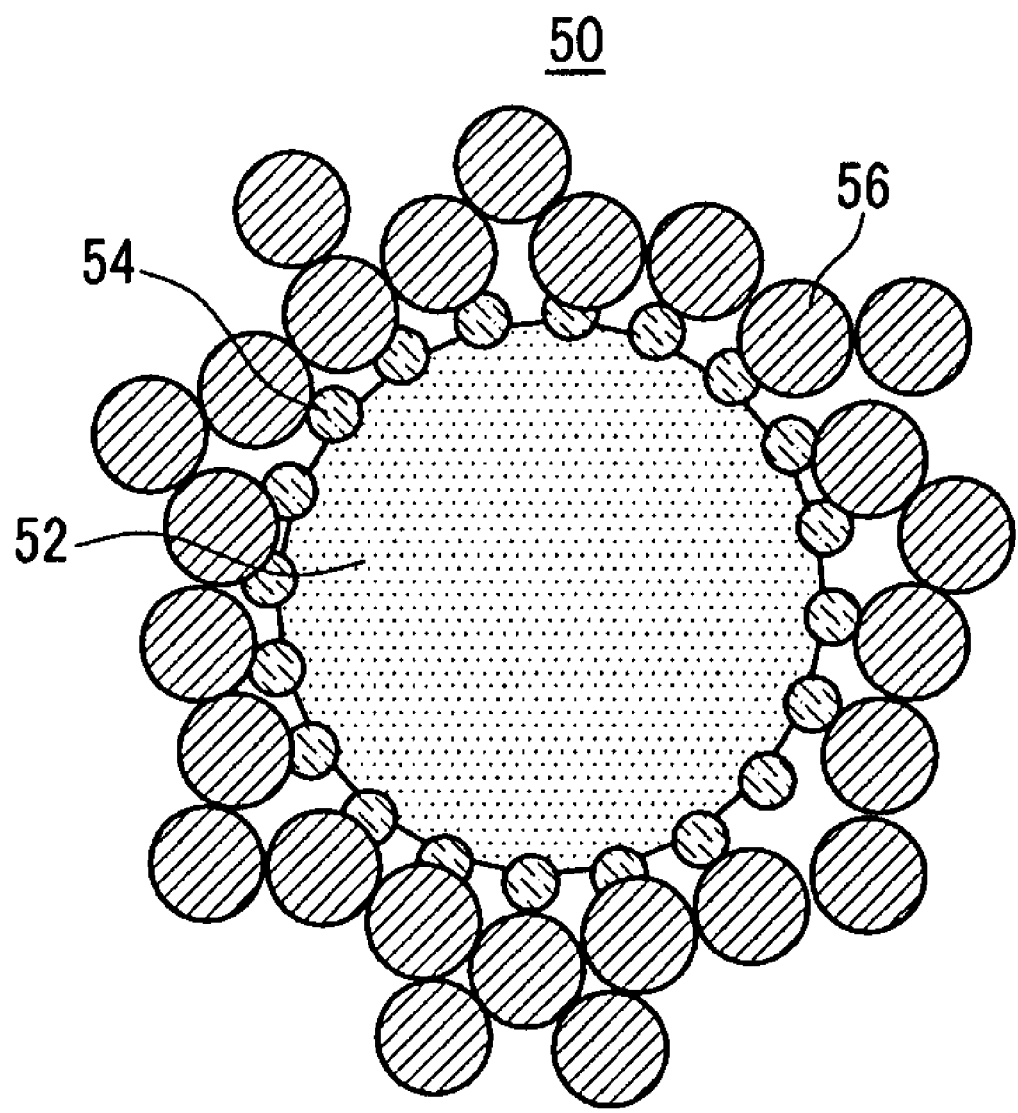
FIG. 1 schematically shows a cathode catalyst for a fuel cell according to one embodiment of the present invention.

The present invention relates to a catalyst including at least one selected from the group consisting of $RuO_2$, Ir, $Ir_2O_3$, $MnO_2$, WC, and combinations thereof, that has been being researched as a substitute for a platinum-based catalyst among catalysts for a cathode of a fuel cell.

The $RuO_2$ and WC of the core material do not belong to a platinum group but has high catalyst activity as well as electrical and ion conductivity. In addition, it has excellent safety for reduction of oxygen. According to one embodiment of the present invention, a catalyst for a cathode includes a core including at least one selected from the group consisting of $RuO_2$, Ir, $Ir_2O_3$, $MnO_2$, WC, and combinations thereof, and Se and Pt disposed on the surface of the core.

In the catalyst of the present invention, Se inhibits oxidation of fuel at the core, and Pt plays a role of improving catalyst activity. In other words, when Pt is added to a catalyst, it can improve its activity compared with one only including the core. In addition, Se can prevent Pt from being poisoned by carbon monoxide, during the operation of a fuel cell.

The catalyst poisoning due to oxygen indicates a phenomenon in which an oxidant surrounds an active site of a cathode catalyst and thereby blocks its normal reaction.

The $RuO_2$ as a core can include a crystalline type or an amorphous type. The amorphous type has high ion and electrical conductivity and excellent catalyst activity.

Herein, a core has a particle size of at least 2 nm and a maximum of 50 nm. In one embodiment, a core has a particle size of at least 5 nm and a maximum of 20 nm. When the core has a particle size of less than the range, it is hard for Se or Pt to exist in an appropriate amount on the surface thereof. When it has a particle size of more than the range, a catalyst may have a decreased specific surface area, causing deterioration in catalyst activity.

Se surrounds the core and Pt is dispersed thereon. The Se plays a role of preventing methanol crossover from an anode, or is used as a mixed reactant from approaching the core as a reaction activity material or Pt dispersed around it. Accordingly, the Se facilitates oxygen, a reactant, to approach an activity material but to cut off methanol.

Herein, the Se and the element in the core may have an atomic ratio of 1:4 to 1:19. When the Se is included in an amount of less than the range, the amount of Se is too small to cut off methanol, causing deterioration in catalyst activity. On the other hand, when the Se is included in an amount of more than the range, it may not smoothly release oxygen as a reactant or water as a product as well as methanol, causing deterioration in catalyst activity. In addition, the Se may reduce electrical conductivity and thereby causes an increase in resistance, and cell performance deteriorates.

According to one embodiment of the present invention, the amount of Pt is critical for catalyst activity and thereby should be controlled. As an amount of Pt increases, a catalyst may have more excellent activity. But, when the amount of Pt decreases, it has resistance effects against hydrocarbon. In order to compromise these two effects, Pt and the element in the core should be included in an atomic ratio ranging from 1:1 to 1:19. When Pt is included in an amount less than this range, it may have little effects on improvement of catalyst activity. On the contrary, when Pt is included in an amount more than this range, the excessive amount of Pt relative to the amount of the core reduces methanol tolerance.

Herein, the particle diameter of Pt is also related to catalyst activity and may be in a range of 1 nm to 5 nm. However, according to one embodiment, it may be in a range of 2 nm to 3 nm. When Pt has a larger particle diameter than this range, a relatively small number of Pt particles may exist on the surface of the core. On the other hand, when it has a smaller particle diameter than this range, there may be so many particles that they cover the entire surface of the core, causing deterioration in catalyst activity.

Particularly, Se and Pt on the surface of the core are in an atomic ratio ranging from 1:2 to 1:19. When they are included less than this atomic ratio range, Se may not cut off methanol and thereby has no methanol tolerance. On the contrary, when they are included more than this atomic ratio range, they may cut off oxygen as well as methanol, interfering with reaction and reducing electrical conductivity.

According to one embodiment of the present invention, a cathode catalyst for a fuel cell has an average particle diameter ranging from 3 nm to 60 nm. In one embodiment, a cathode catalyst for a fuel cell has an average particle diameter ranging from 6 nm to 30 nm. Accordingly, even if a small amount is included, it can have equivalent or better catalyst activity than a conventional one.

In addition, a cathode catalyst of the present invention may be used in a form of a metal itself (a black catalyst) or supported on a carrier. When it is supported on a carrier, it is included in an amount of 40 wt % to 95 wt %. When it is included in an amount less than 40 wt %, its amount may be too small, causing deterioration in catalyst activity. On the other hand, when it is included in an amount more than 95 wt %, the amount of a carrier is too small, reducing conductivity.

The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used.

A cathode catalyst for a fuel cell according to the present invention can be prepared in the following two methods.

Method A

The core materials as a primary catalyst can be commercially purchased or directly synthesized. For example, when $RuO_2$ is directly synthesized, it can be prepared by dissolving a compound for forming $RuO_2$, $RuCl_3$ hydrate, or a $Ru(OH)_3$ compound in a solvent and then drying and firing the solution. The firing is performed at a temperature of 150 to 400° C. When it is performed at a temperature below 170° C., amorphous $RuO_2$ is prepared, while when at a temperature above 170° C., crystalline $RuO_2$ is prepared.

Then, the core is mixed with a compound including Pt. The mixture is dried at a temperature of 60 to 80° C. for 10 minutes to one day, and fired at a temperature of 50 to 250° C. under a 10% hydrogen atmosphere (the rest includes nitrogen or argon gas), disposing Pt on the surface of the core. Herein, the compound including Pt may include chloride or nitride including Pt, but according to another embodiment, it may include $H_2PtCl_6.6H_2O$.

Next, the core with Pt on the surface is uniformly mixed with a compound including Se. The mixture is dried and heat-treated, preparing a catalyst supported with Se and Pt on the surface of the core. The drying is performed at a temperature of 70 to 90° C. for 2 to 30 hours. In addition, the heat treatment may be performed at a temperature of 150 to 900° C. under a nitrogen, helium, or argon atmosphere for 2 to 6 hours. Herein, the compound including Se may be chloride or nitride including Se.

FIG. 1 shows a catalyst 50 prepared in the above method. Referring to FIG. 1, the catalyst 50 includes a core 52 as a primary catalyst, Pt 54 as a secondary catalyst that is formed on the surface of the core 52, and Se 56 surrounding the core 52 and the Pt 54 thereon. As a result, a hydrocarbon fuel such as methanol can be blocked from approaching the core.

Method B

The core material is provided as in Method A. The core material is uniformly mixed with a compound including Se. The mixture is dried and fired, forming Se on the surface of the core.

Next, the core with Se on the surface is uniformly mixed with a compound including Pt. The mixture is dried and fired, preparing a catalyst with Se and Pt on the surface of the core.

Figure 2:
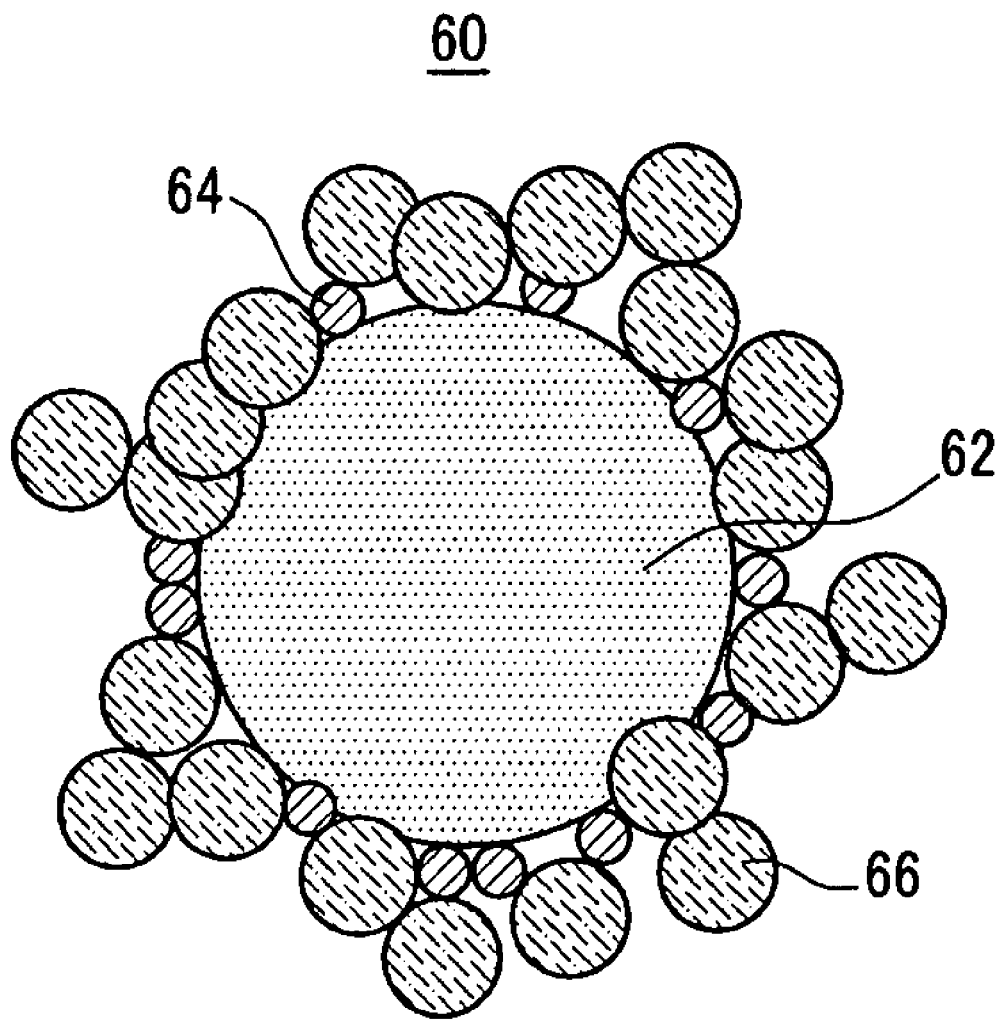
FIG. 2 schematically shows a cathode catalyst for a fuel cell according to another embodiment of the present invention.

FIG. 2 show a catalyst 60 prepared according to the aforementioned method. Referring to FIG. 2, the catalyst 60 includes a core 62 as a primary catalyst and Se 66 formed on the surface of the core 62, and also Pt 64 formed on the surface of the core 62 where the Se 66 does not exist.

Even when Se is first formed on the surface of a core, and a platinum compound is added later, platinum can be reduced between the core and Se. The reason is that platinum can interact with the core and move on the surface thereof, and thereby be reduced between the core and Se.

Herein, when a compound including the core, Pt, and Se is used in the methods A and B, its amount can be appropriately regulated depending on a desired catalyst composition as far as they are in a catalyst composition range of the present invention.

Then, the catalyst prepared according to the methods A and B can be supported on a carrier. The carrier may include any aforementioned one.

The above catalyst is adapted to a cathode. At an anode, a conventional platinum-based catalyst may be used. The platinum-based catalyst may include at least one selected from the group consisting of platinum, ruthenium, osmium, platinum-ruthenium alloys, platinum-osmium alloys, platinum-palladium alloys, platinum-M alloys (where M is a transition element selected from the group consisting of Ga, Ti, V, Cr, Mn, Fe, Co, Ni, Cu, Zn, Sn, Mo, W, Rh, Ru, and combinations thereof), and combinations thereof. More specifically, non-limiting examples of the platinum-based catalyst are selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in a form of a metal itself (black catalyst), or one supported on a carrier. The carrier may include carbon such as graphite, denka black, ketjen black, acetylene black, carbon nanotubes, carbon nanofiber, carbon nanowire, carbon nanoballs, or activated carbon, or an inorganic particulate such as alumina, silica, zirconia, or titania. The carbon can be generally used.

The catalyst is composed of a catalyst layer on an electrode substrate. The catalyst layers may include a binder resin to improve their adherence and proton transfer properties.

The binder resin may be a proton conductive polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly (2,5-benzimidazole), and copolymers thereof.

H of a proton conductive group can be replaced with Na, K, Li, Cs, or tetrabutyl ammonium in a side chain of the proton conductive polymer. When the Na is substituted for H in an ion exchange group at the terminal end of the proton conductive group, NaOH is used. When the H is replaced with tetrabutyl ammonium, tributyl ammonium hydroxide is used. K, Li, or Cs can also be replaced by using appropriate compounds. A method of substituting Na, K, Li, Cs, or tetrabutyl ammonium for H is known in the related art, and thereby is not further described in detail.

The binder resin may be used singularly or as a mixture. Optionally, the binder resin may be used along with a non-conductive polymer to improve adherence between a polymer electrolyte membrane and the catalyst layer. The amount of the binder resin may be adjusted to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

The catalysts of the cathode and anode are respectively formed on an electrode substrate. The electrode substrates respectively support the anode and the cathode and provide a path for transferring the fuel and the oxidant to catalyst layers. In one embodiment, the electrode substrates are formed from a material such as carbon paper, carbon cloth, carbon felt, or a metal cloth (a porous film composed of a metal fiber or a metal film disposed on a surface of a cloth composed of polymer fibers). The electrode substrate is not limited thereto.

The electrode substrates may be treated with a fluorine-based resin to be water-repellent to prevent deterioration of diffusion efficiency due to water generated during operation of the fuel cell. The fluorine-based resin may include polyvinylidene fluoride, polytetrafluoroethylene, polyhexafluoro propylene, polyperfluoroalkylvinylether, polyperfluoro sulfonylfluoride alkoxyvinyl ether, fluorinated ethylene propylene, polychlorotrifluoro ethylene, or copolymers thereof, but is not limited thereto.

A microporous layer can be added between the aforementioned electrode substrates and the catalyst layers to increase reactant diffusion effects.

The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by applying a composition including a conductive powder, a binder resin, and a solvent on the conductive substrate. The binder resin may include, but is not limited to, polytetrafluoro ethylene, polyvinylidene fluoride, polyhexafluoro propylene, polyperfluoroalkylvinyl ether, polyperfluoro sulfonylfluoride alkoxy vinyl ether, polyvinyl alcohol, cellulose acetate, or copolymers thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, or tetrahydrofuran. The coating method may include, but is not limited to, screen printing, spray coating, doctor blade methods, gravure coating, dip coating, silk screening, painting, or so on, depending on the viscosity of the composition.

The membrane-electrode assembly including the cathode and anode includes a polymer electrolyte membrane between the cathode and anode.

The polymer electrolyte membrane functions as an ion exchanger by delivering a proton produced at the catalyst layer of the anode to the catalyst layer of the cathode. The proton conductive electrolyte membrane may include any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether including a sulfonic acid group, defluorinated polyetherketone sulfide, aryl ketone, poly(2,2'-(m-phenylene)-5,5'-bibenzimidazole), poly (2,5-benzimidazole), copolymer thereof, and mixtures thereof. The polymer electrolyte membrane generally has a thickness ranging from 10 μm to 200 μm.

H of a proton conductive group can be replaced with Na, K, Li, Cs, or tetrabutyl ammonium in a side chain of the proton conductive polymer. When the Na is substituted for H in an ion exchange group at the terminal end of the proton conductive group, NaOH is used. When the H is replaced with tetrabutyl ammonium, tributyl ammonium hydroxide is used. K, Li, or Cs can also be replaced by using appropriate compounds. A method of substituting Na, K, Li, Cs, or tetrabutyl ammonium for H is known in the related art, and thereby is not further described in detail.

According to an embodiment of the present invention, a fuel cell system including the above membrane-electrode assembly is provided.

The electricity generating element includes a membrane-electrode assembly and a separator (also referred to as a bipolar plate), and generates electricity through oxidation of a fuel and reduction of an oxidant.

The fuel supplier supplies a fuel including hydrogen to the electricity generating element, and the oxidant supplier supplies an oxidant to the electricity generating element. The oxidant includes oxygen or air. The fuel includes liquid or gaseous hydrogen, or a hydrocarbon-based fuel such as methanol, ethanol, propanol, butanol, or natural gas.

Figure 3:
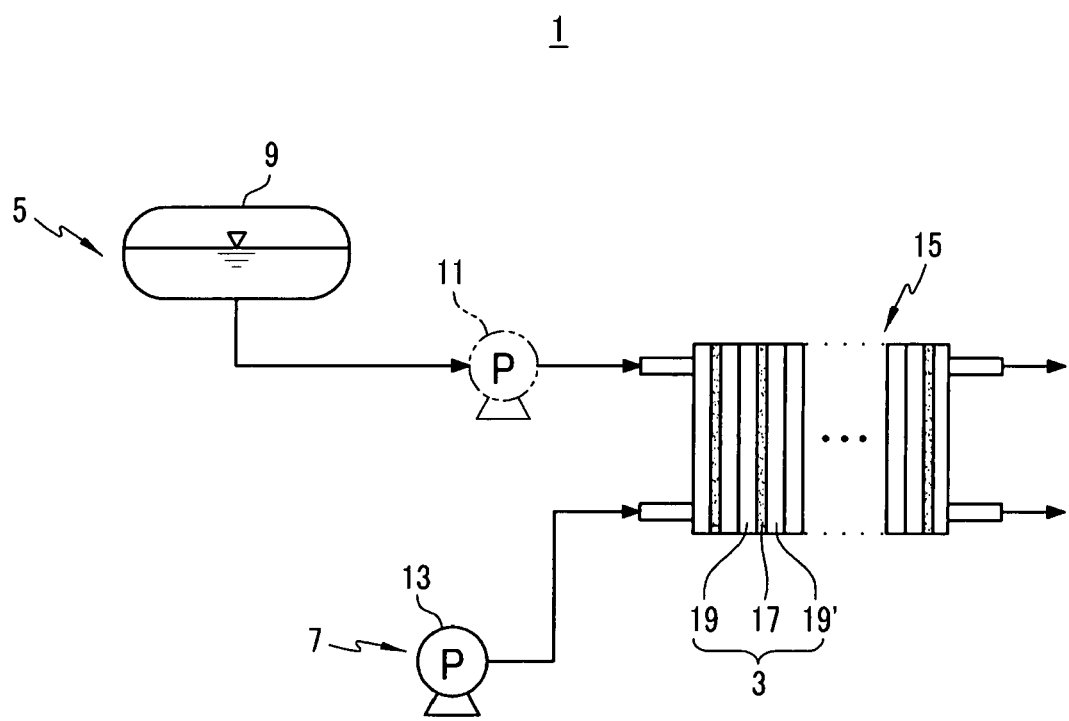
FIG. 3 schematically shows a fuel cell system according to one embodiment of the present invention.

FIG. 3 shows a schematic structure of a fuel cell system that will be described in detail with reference to this accompanying drawing as follows. FIG. 3 illustrates a fuel cell system wherein a fuel and an oxidant are provided to an electricity generating element in a diffusion manner, but the present invention is not limited to such a structure. The fuel cell system of the present invention may alternatively include a structure wherein a fuel and an oxidant are provided through pumps.

The fuel cell system 1 includes at least one electricity generating element 3 that generates electrical energy through an electrochemical reaction of a fuel and an oxidant, a fuel supplier 5 for supplying a fuel to the electricity generating element 3, and an oxidant supplier 7 for supplying an oxidant to the electricity generating element 3. In addition, the fuel supplier 5 is equipped with a tank 9 that stores the fuel, and the pump 11 that is connected to the tank 9. The fuel pump 11 supplies fuel stored in the tank 9 with a predetermined pumping power.

The oxidant supplier 7, which provides the electricity generating element 3 with an oxidant, is equipped with at least one pump 13 for supplying an oxidant with a predetermined pumping power.

The electricity generating element 3 includes a membrane-electrode assembly 17 that oxidizes hydrogen or a fuel and reduces an oxidant, and separators 19 and 19' that are respectively positioned at opposite sides of the membrane-electrode assembly and supply the hydrogen or a fuel, and the oxidant. At least one electricity generating element 17 is composed in a stack 15.

The following examples illustrate the present invention in more detail. However, it is understood that the present invention is not limited by these examples.

EXAMPLE 1

10 g of $RuCl_3$ hydrate was dissolved in 100 ml of methanol. The solution was placed in a reactor, and then 1 g of ketjen black was added thereto. Herein, the ketjenblack was treated with strong nitric acid for 12 hours and treated at 500° C. under an air atmosphere for 4 hours before use.

Next, an ultrasonic wave was applied to the resulting reactant at 80° C., and the resulting reactant was dried for 10 hours, heat-treated at 150° C. under a vacuum atmosphere for 2 hours, and fired at 150° C. under an air atmosphere for 5 hours, preparing amorphous $RuO_2$ with a particle diameter of 10 nm.

5 g of the prepared $RuO_2$ was dispersed in 200 ml of methanol, and 5 g of $H_2PtCl_6 \cdot 6H_2O$ was added thereto, preparing a uniform solution. The acquired reactant was dried at 70° C. for 2 hours and thereafter, at 50° C. under a reduced pressure for 24 hours. Then, it was heat-treated at 100° C. under a 10% hydrogen atmosphere, disposing Pt on the surface of a $RuO_2$ core.

2 g of the $RuO_2$ core with Pt on the surface was dissolved in water, and 2 g of $Se(NO_3)_3 \cdot 9H_2O$ was added thereto. The mixture was uniformly mixed for a reaction. The resulting reactant was dried at 60° C. for 1 hour and then was dried at 70° C. under reduced pressure for 24 hours, preparing a catalyst.

Herein, the catalyst includes Pt with a particle diameter of 3 nm on the surface of an amorphous $RuO_2$ core in an atomic ratio of 1:4, and also includes Se surrounding them in an atomic ratio of 1:9 between Se and Ru.

EXAMPLE 2

A catalyst was prepared according to the same method as in Example 1, except that a crystalline particle as $RuO_2$ was used. The crystalline $RuO_2$ was prepared through firing at 200° C. for 5 hours.

EXAMPLE 3

5 g of $RuO_2$ prepared according to Example 1 was dispersed in 200 ml of methanol, and 2.0 g of $Se(NO_3)_3 \cdot 9H_2O$ was added thereto, preparing a uniform solution. The acquired reactant was dried at 60° C. for 1 hour and then was dried at 70° C. under reduced pressure for 24 hours to dispose Se on the surface of a $RuO_2$ core.

2 g of the $RuO_2$ core with Se on the surface was dissolved in water, and 5 g of $H_2PtCl_6 \cdot 6H_2O$ was added thereto. The mixture was uniformly mixed for a reaction. Next, the mixture was dried at 60° C. for 1 hour and then was dried at 70° C. under reduced pressure for 24 hours, preparing a catalyst.

Herein, the prepared catalyst included Pt with a particle diameter of 3.5 nm that was formed on the surface of an amorphous $RuO_2$ core. An atomic ratio of Pt to Ru was 1:4. The prepared catalyst also included Se surrounding their surface of the amorphous $RuO_2$ core. An atomic ratio of Se to Ru was 1:9.

EXAMPLE 4

A catalyst was prepared according to the same method as in Example 3, except for using a crystalline particle as $RuO_2$. Herein, the crystalline $RuO_2$ was prepared through firing at 200° C. for 2 hours.

The particle diameter and composition of the catalysts according to Examples 1 to 4 are shown in the following Table 1.

TABLE 1

| | $RuO_2$ (crystallinity/ Particle diameter) | Pt (particle diameter) | Pt:Ru (atomic ratio) | Se:Ru (atomic ratio) | Particle diameter of catalyst |
|---|---|---|---|---|---|
| Example 1 | amorphous/10 nm | 3.0 nm | 1:4 | 1:9 | 13.5 nm |
| Example 2 | crystalline/10 nm | 3.2 nm | 1:4 | 1:9 | 14 nm |
| Example 3 | amorphous/10 nm | 3.5 nm | 1:4 | 1:9 | 14 nm |
| Example 4 | crystalline/10 nm | 3.6 nm | 1:4 | 1:9 | 14 nm |

EXPERIMENTAL EXAMPLE 1

Fabrication of a Unit Cell

Each catalyst prepared according to Examples 1 to 4, a polytetrafluoroethylene polymer, and ethanol as a solvent were mixed to prepare a coating composition for forming a catalyst layer. A carbon paper was coated with the coating composition to prepare an electrode.

The electrode was used as an anode and a cathode, and a Nafion polymer membrane (DuPon Co.) was interposed therebetween. The resulting product was hot-rolled, preparing a membrane/electrode assembly.

The membrane/electrode assembly was interposed between two sheets of gaskets and also two separators having a gas flow channel and a cooling channel, and then compressed between copper end plates, fabricating a unit cell.

Experiment on the Unit Cell Performance

The unit cells including catalysts of Examples 1 to 4 were examined regarding their performance. The results are shown in FIGS. 4 and 5

Herein, the examination of the unit cells was performed by measuring their current density and output power density while they were injected with 1M of methanol and dry air and then operated at 50° C.

Figure 4:
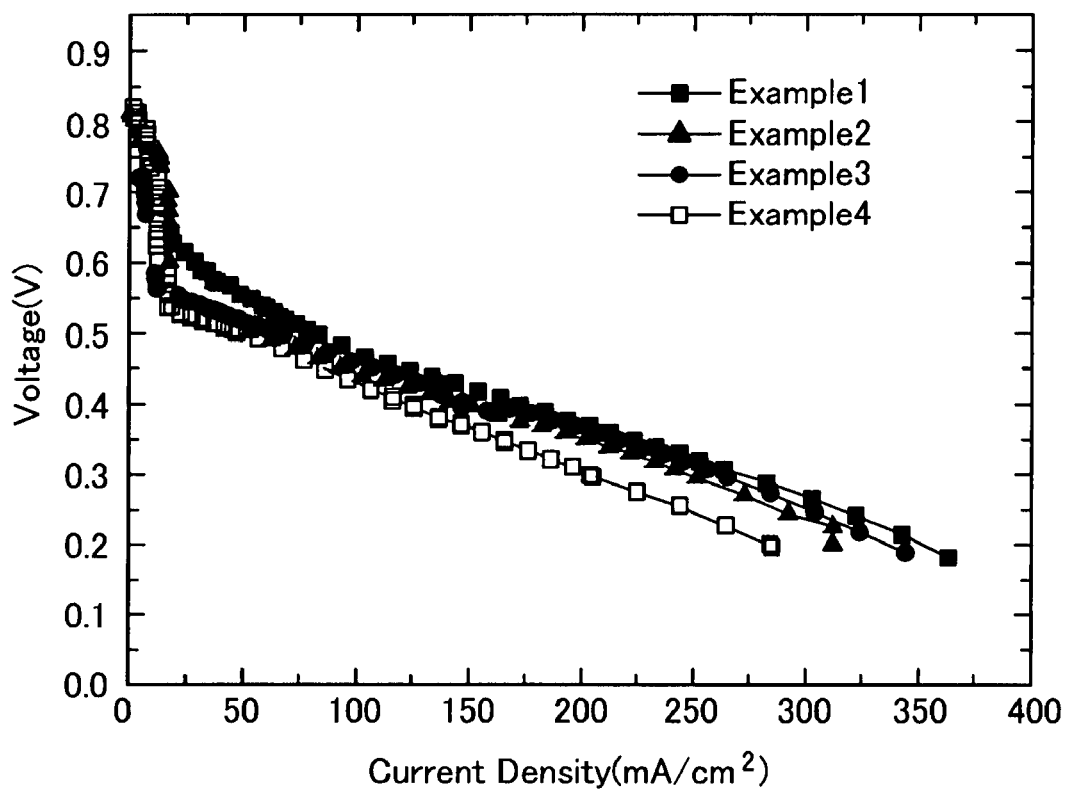
FIG. 4 is a graph showing current density versus voltage characteristics of unit cells including catalysts according to Examples 1 to 4.

FIG. 4 is a graph showing current density versus voltage characteristics of unit cells including catalysts of Examples 1 to 4. FIG. 5 is a graph showing current density versus power characteristics of unit cells including catalysts of Examples 1 to 4.

Figure 5:
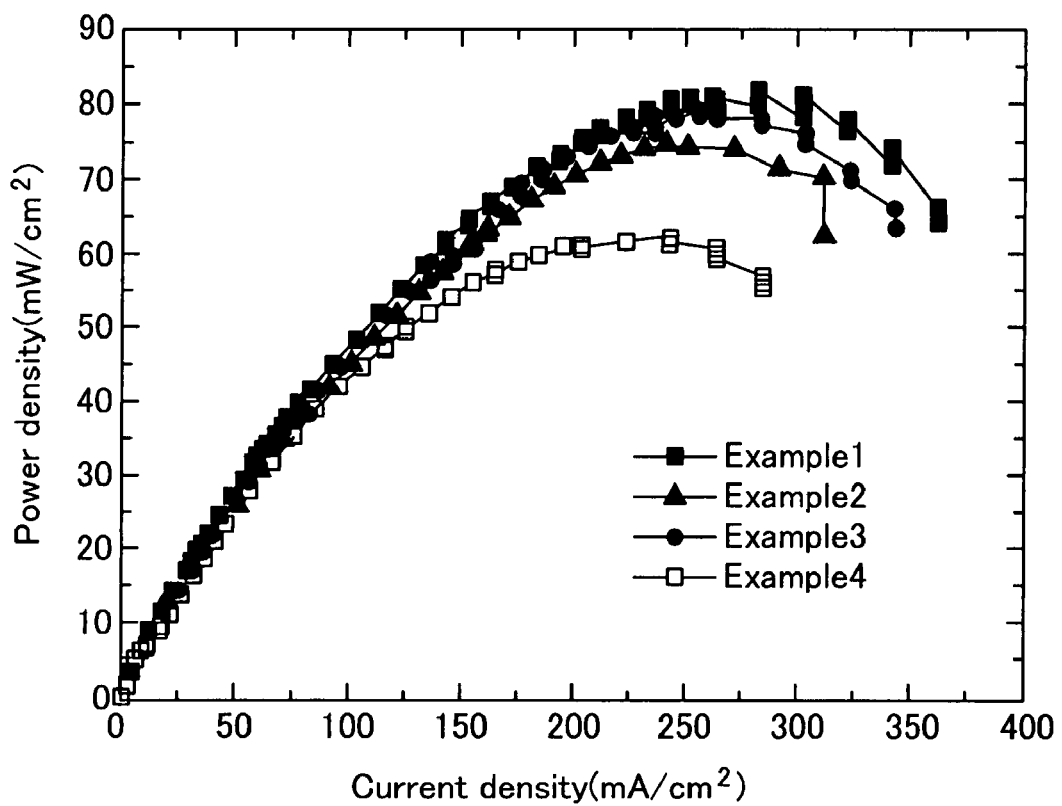
FIG. 5 is a graph showing current density versus power characteristics of unit cells including catalysts according to Examples 1 to 4.

Referring to FIGS. 4 and 5, the catalyst of Example 1 turned out to have the highest performance. The reason is that the catalyst includes relatively smaller Pt particles than $RuO_2$ particle with high electrical and ion conductivity, and thereby has high oxygen reduction activity.

In addition, the catalysts of Examples 2 and 3 turned out to have similar performance to each other. The reason is that these two catalysts have a similar Pt particle size.

Furthermore, the catalyst of Example 4 does not include Pt under Se, and thereby has a relatively low methanol tolerance. They may have lower performance than those of Examples 1 and 2. Resultantly, they are not satisfactory as a catalyst.

Therefore, a cathode catalyst of the present invention can have excellent catalyst efficiency even though platinum is less included therein.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cathode catalyst for a fuel cell comprising:
   a core comprising at least an element selected from the group consisting of $Ir_2O_3$, $MnO_2$, WC, amorphous $RuO_2$, and combinations thereof;
   Se surrounding the core; and
   Pt dispersed in the Se, the Pt dispersed Se disposed to completely enclose the core, particles of the Pt being disposed on the surface of the core.

2. The cathode catalyst of claim 1, wherein the core has an average particle diameter ranging from 2 nm to 50 nm.

3. The cathode catalyst of claim 1, wherein the Pt has an average particle diameter ranging from 1 nm to 5 nm.

4. The cathode catalyst of claim 1, wherein the cathode catalyst has an average particle diameter ranging from 3 nm to 60 nm.

5. The cathode catalyst of claim 1, wherein the Se and the element in the core exist in an atomic ratio ranging from 1:4 to 1:19.

6. The cathode catalyst of claim 1, wherein the Pt and the element in the core exist in an atomic ratio ranging from 1:1 to 1:19.

7. The cathode catalyst of claim 1, wherein the Se and the Pt exist in an atomic ratio ranging from 1:2 to 1:19.

8. The cathode catalyst of claim 1, wherein the Se is disposed on the surface of the core, and the Pt is disposed on a portion of the surface of the core where the Se does not exist.

9. A membrane-electrode assembly for a fuel cell, comprising:
   an anode;
   a cathode facing the anode, the cathode including a catalyst comprising Se, Pt, and a core comprising at least an element selected from the group consisting of $Ir_2O_3$, $MnO_2$, WC, amorphous $RuO_2$, and combinations thereof, the Se surrounding the core and the Pt dispersed in the Se, the Pt dispersed Se being disposed to completely enclose the core, particles of the Pt being disposed on the surface of the core; and
   a polymer electrolyte membrane interposed between the anode and the cathode.

10. The membrane-electrode assembly of claim 9, wherein the core has an average particle diameter ranging from 2 nm to 50 nm.

11. The membrane-electrode assembly of claim 9, wherein the Pt has an average particle diameter ranging from 1 nm to 5 nm.

12. The membrane-electrode assembly of claim 9, wherein the catalyst has an average particle diameter ranging from 3 nm to 60 nm.

13. The membrane-electrode assembly of claim 9, wherein the Se and the element in the core exist in an atomic ratio ranging from 1:4 to 1:19.

14. The membrane-electrode assembly of claim 9, wherein the Pt and the element in the core exist in an atomic ratio ranging 1:1 to 1:19.

15. The membrane-electrode assembly of claim 9, wherein the Se and the Pt exist in an atomic ratio ranging from 1:2 to 1:19.

16. The membrane-electrode assembly of claim 9, wherein the Se is disposed on the surface of the core, and the Pt is disposed on a portion of the surface of the core where the Se does not exist.

17. A fuel cell system comprising:
an electrical generator comprising:
at least one membrane-electrode assembly comprising:
an anode;
a cathode facing the anode, the cathode including a catalyst comprising Pt, Se, and a core comprising at least an element selected from the group consisting of $Ir_2O_3$, $MnO_2$, WC, amorphous $RuO_2$, and combinations thereof, wherein the Se surrounds the core and the Pt is dispersed in the Se, the Pt dispersed Se being disposed to completely enclose the core, particles of the Pt being disposed on the surface of the core; and
a polymer electrolyte membrane interposed between the anode and the cathode; and
a separator disposed next to the membrane-electrode assembly;
a fuel supplier for supplying a fuel to the electrical generator; and
an oxidant supplier for supplying an oxidant to the electrical generator.

* * * * *